US011055655B1

(12) United States Patent
Neumann

(10) Patent No.: US 11,055,655 B1
(45) Date of Patent: Jul. 6, 2021

(54) METHOD AND SYSTEM FOR GENERATING AN ALIMENTARY COMBINATION HELP UPDATE

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC., Lakewood, CO (US)

( * ) Notice: Subject to any disclaimer, the term of this patent is extended or adjusted under 35 U.S.C. 154(b) by 0 days.

(21) Appl. No.: 17/007,302

(22) Filed: Aug. 31, 2020

(51) Int. Cl.
*G06Q 10/08* (2012.01)
*G01C 21/34* (2006.01)
*G06N 20/00* (2019.01)

(52) U.S. Cl.
CPC ... *G06Q 10/08355* (2013.01); *G01C 21/3415* (2013.01); *G06N 20/00* (2019.01)

(58) Field of Classification Search
CPC ............ G06Q 10/08355; G06N 20/00; G01C 21/3415
See application file for complete search history.

(56) References Cited

U.S. PATENT DOCUMENTS

| 10,204,354 B2 | 2/2019 | Scotto et al. |
| 2018/0089621 A1* | 3/2018 | Perez Barrara .... G06Q 10/0833 |
| 2019/0228375 A1* | 7/2019 | Laury ................... G05D 1/0088 |

* cited by examiner

*Primary Examiner* — Michael D Lang
(74) *Attorney, Agent, or Firm* — Caldwell Intellectual Property Law, LLC

(57) ABSTRACT

A system for generating an alimentary combination help update is disclosed. The system comprises a computing device configured to receive a request for an alimentary combination from a user. Computing device may generate an initial physical transfer path as a function of the request. Computing device may identify a trouble state as a function of the request for the alimentary combination. The trouble state is classified to at least a source. Computing device may generate a modified physical transfer path as a function of the initial physical transfer path and the source. A method for generating an alimentary combination help update is also disclosed.

20 Claims, 6 Drawing Sheets

METHOD AND SYSTEM FOR GENERATING AN ALIMENTARY COMBINATION HELP UPDATE

FIELD OF THE INVENTION

The present invention generally relates to the field of machine-learning. In particular, the present invention is directed to a method and system for generating an alimentary combination help update.

BACKGROUND

Data management using artificial intelligence and machine-learning solutions help to optimize data management and processes which helps to reduce human error. Aiding a user when a problem arises is one area where the classification of data may be important.

SUMMARY OF THE DISCLOSURE

In an aspect of the disclosure, a system for generating an alimentary combination help update is disclosed. The system comprises a computing device configured to receive a request for an alimentary combination from a user. Computing device may generate an initial physical transfer path as a function of the request. Computing device may identify a trouble state as a function of the request for the alimentary combination. The trouble state is classified to at least a source. Computing device may generate a modified physical transfer path as a function of the initial physical transfer path and the source.

In another aspect of the disclosure a method for generating an alimentary combination help update is disclosed. The method receives a request for an alimentary combination from a user. The method generates an initial physical transfer path as a function of the request. The method identifies a trouble state as a function of the request for the alimentary combinations. The method classifies the trouble state to at least a source. The method generates a modified physical transfer path as a function of the initial physical transfer path and the source.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a help ticket when a problem arises with a delivery of an alimentary combination. The problem ticket will notify a user of the problem. The user will also obtain an updated predicted delivery time for arrival of the alimentary combination at the location of the user. Machine-learning processes are used to determine the trouble state, the trouble state cause, and the trouble state owner.

Figure 1A:
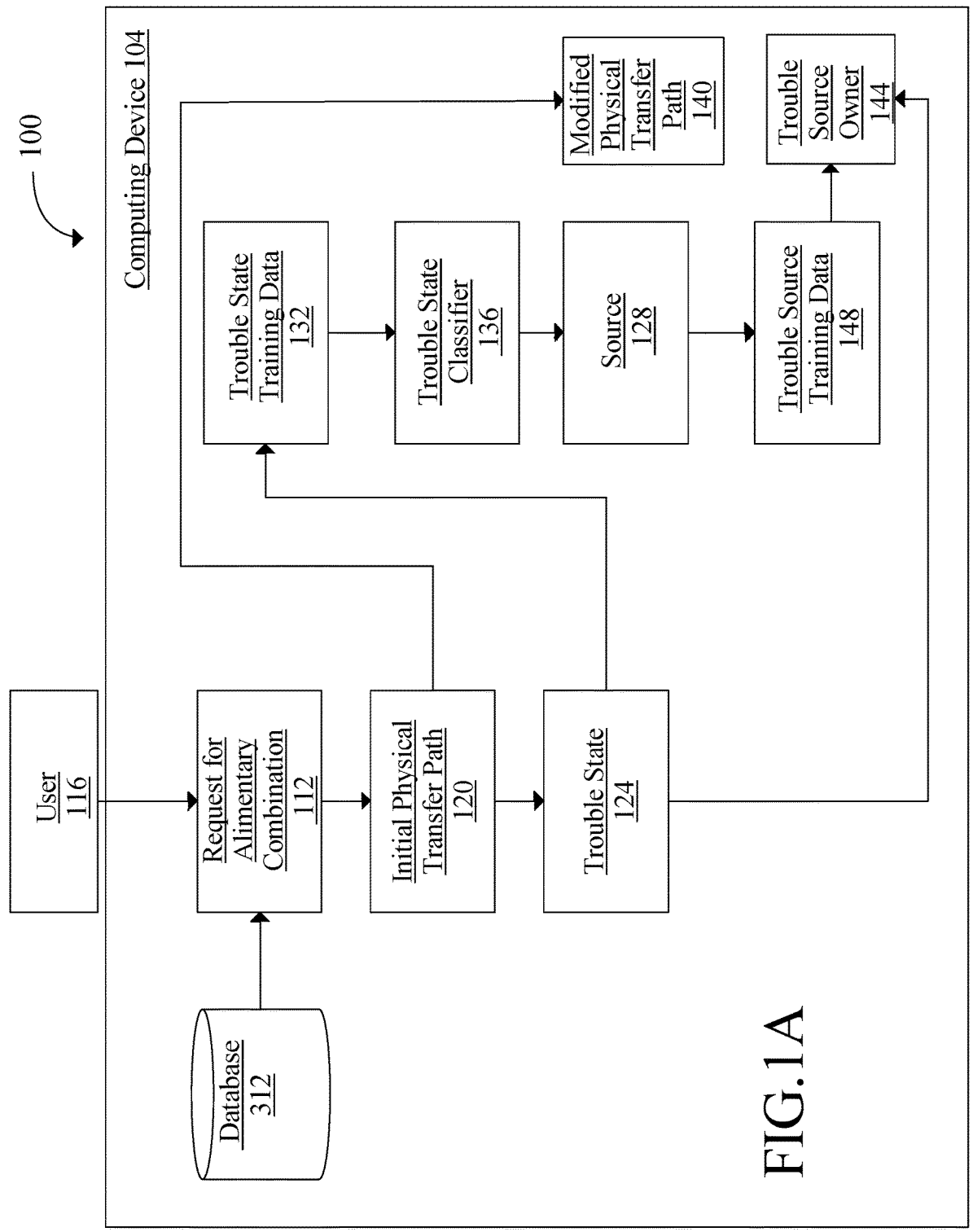
FIG. 1A is a block diagram of an exemplary embodiment of a system generating an alimentary combination help update.

Referring now to FIG. 1A, an exemplary embodiment of a system 100 for generating an alimentary combination help update is illustrated. System 100 may be used for any type of product or service ordered which may require delivery to a user. The orders may include, but not limited to, delivery of prescription drugs, electronics, and/or services such as plumbing, installation of utilities, and the like. System includes a computing device 104. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently, or may include two or more computing device 104 operating in concert, in parallel, sequentially or the like; two or more computing device 104s may be included together in a single computing device 104 or in two or more computing device 104s. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing device 104s, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing device 104s in a first location and a second computing device 104 or cluster of computing devices in a second location. Computing device 104 may include one or more computing devices dedicated to data storage, security, distribution of traffic for load balancing, and the like. computing device 104 may distribute one or more computing tasks as described below across a plurality of computing devices of computing device 104, which may operate in parallel, in series, redundantly, or in any other manner used for distribution of tasks or memory between computing device 104s. Computing device 104 may be implemented using a "shared nothing" architecture in which data is cached at the worker, in an embodiment, this may enable scalability of system 100 and/or computing device 104.

Computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1A, computing device 104 may connect to and/or include a database 108. Database 108 may be implemented, without limitation, as a relational database 108, a key-value retrieval database 108 such as a NOSQL database 108, or any other format or structure for use as a database 108 that a person skilled in the art would recognize as suitable upon review of the entirety of this disclosure. Database 108 may alternatively or additionally be implemented using a distributed data storage protocol and/or data structure, such as a distributed hash table or the like. Database 108 may include a plurality of data entries and/or records as described above. Data entries in a database 108 may be flagged with or linked to one or more additional elements of information, which may be reflected in data entry cells and/or in linked tables such as tables related by one or more indices in a relational database 108. Persons skilled in the art, upon reviewing the entirety of this disclosure, will be aware of various ways in which data entries in a database 108 may store, retrieve, organize, and/or reflect data and/or records as used herein, as well as categories and/or populations of data consistently with this disclosure. In some embodiments, network data, or other information such as user information, transfer party information, and alimentary provider information, may be stored in and/or retrieved from database 108.

Figure 2:
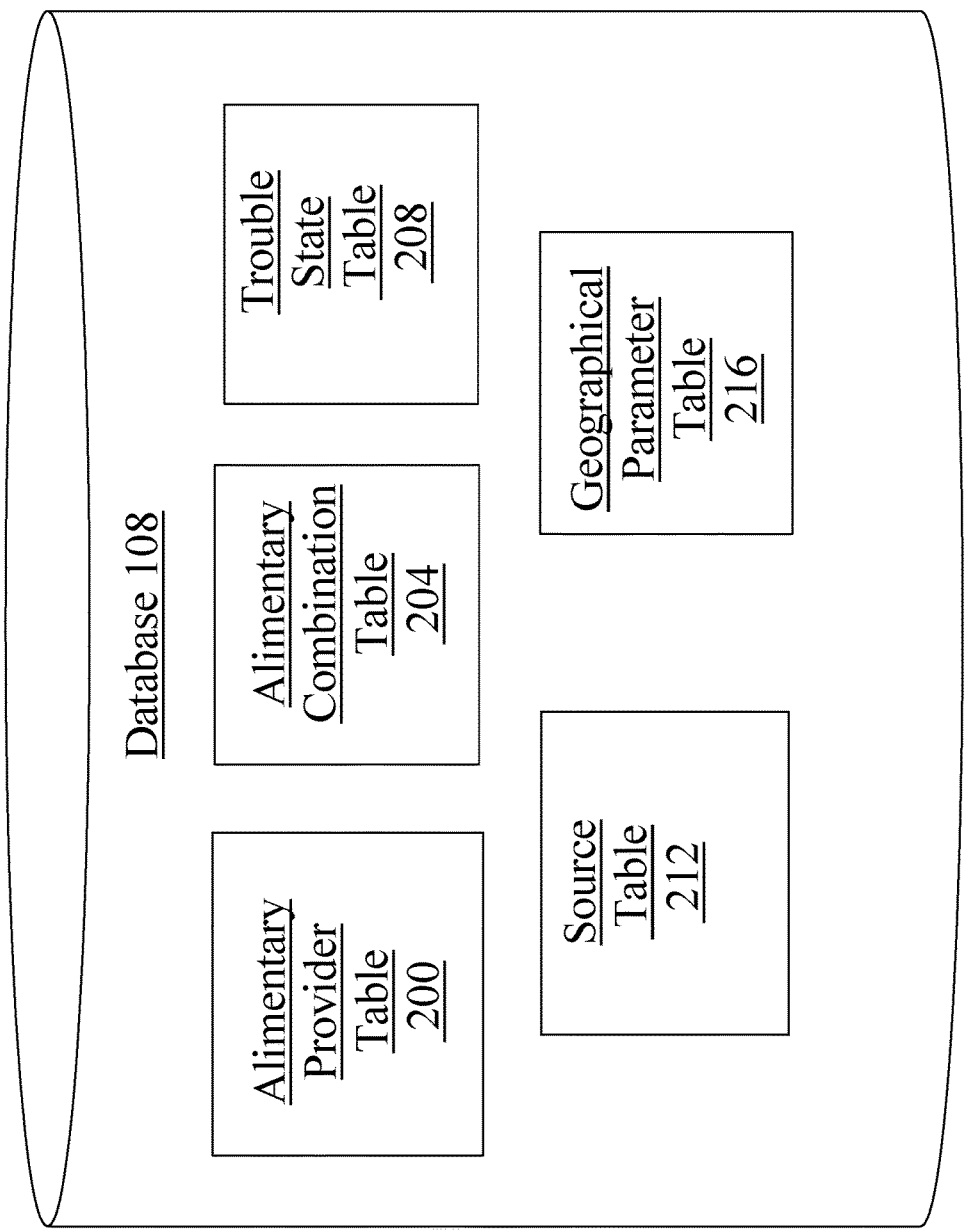
FIG. 2 is a block diagram of an exemplary embodiment of a database.

Referring now to FIG. 2 an exemplary embodiment of a database 108 is illustrated. Database 108 may, as a non-limiting example, organize data stored in the database according to one or more database tables. One or more database tables may be linked to one another by, for instance, common column values. For instance, a common column between two tables of database 108 may include an identifier of a first alimentary provider, for instance as defined below; as a result, a query may be able to retrieve all rows from any table pertaining to a given first alimentary provider. Other columns may include any other category usable for organization or subdivision of data, including types of data, common pathways between, for example, an alimentary combination and a first alimentary provider, or the like; persons skilled in the art, upon reviewing the entirety of this disclosure, will be aware of various ways in which expert data from one or more tables may be linked and/or related to expert data in one or more other tables.

Still referring to FIG. 2, one or more database tables in database 108 may include, as a non-limiting example, an alimentary provider table 200, which may be used to store records and attributes related to alimentary providers. This may include, but not limited to, names of alimentary providers, type of cuisine, or the like. As another non-limiting example, one or more tables in database 108 may include alimentary combination table 204 which may be used to store attributes of alimentary combinations such as, but not limited to, time of preparation, allowed ingredient substitutions, or the like. As another non-limiting example, one or more tables in database 108 may include a trouble state table 208. A trouble state table 208 may include, but not limited to trouble states that may impact delivery of an alimentary combination to user 116, information on frequency of occurrence, and the like. As another non-limiting example, one or more tables in database 108 may include trouble source table 212. A trouble source table 212 may include sources of potential trouble states, correction parameters, and the like. As another non-limiting example, one or more tables in database 108 may include trouble source owner table 216. A trouble source owner table 216 may include, but not limited to, a listing of potential owners of trouble state, contact information, frequency of occurrence, and the like.

Still referring to FIG. 1A, computing device 104 is configured to receive a request for an alimentary combination 112 from user 116. An "alimentary combination" is defined for the purposes of this disclosure as a combination of ingredients that an alimentary provider and/or alimentary provider device indicates may be provided, for instance and without limitation in the form of a meal. As used in this disclosure, "alimentary providers" may include any entities that prepare alimentary combinations. As a non-limiting example, alimentary providers may prepare alimentary combinations at a restaurant. Other such alimentary providers may include any combination of one or more of the following: restaurants, bars, cafes, or other vendor of food or beverages, such as a hotel. As an example, a user 116 may order a pepperoni pizza from a pizza restaurant. User 116 may select to have the pizza delivered to any location, such as but not limited to, the user's residence, the user's workplace, or the like. The delivery may take place by transfer party directly employed by the alimentary provider. A "transfer party," as defined in this disclosure, is a person and/or device that transports alimentary combinations to one or more users requesting alimentary combinations. Transfer party may be on foot, or traveling by vehicle, such as a car, scooter, bicycle, etc. One or more transfer parties may be directed to one or more alimentary providers to receive an order placed by users and deliver the orders to the users located at corresponding destinations, which may include without limitation residential or commercial addresses. User 116 may select a third-party delivery service such as, but not limited to, Uber Eats®, Grubhub®, DoorDash®, and the like. Alternatively, user 116 may select to pick up the pizza at the location of the alimentary provider. A user may include a single human being. User 116 may include a plurality of human beings.

Still with reference to FIG. 1A, computing device may generate an initial physical transfer path 120 as a function of the request for an alimentary combination 112. As used in this disclosure, a "physical transfer path" is a path that a transfer party may take to deliver the alimentary combination to the user. As a non-limiting example, computing device may generate an initial physical transfer path 120 as a function of the physical distance between the alimentary provider and user 116. An initial physical transfer path 120 may include a path to an aggregation depot. As used in this disclosure, an "aggregation depot" is defined as a centralized drop-off location of, for example, alimentary combinations, where the different alimentary combinations may be aggregated so they may be delivered to a plurality of users. An initial physical transfer path 120 may include a path selected as a function of delivery parameters such as traffic conditions, weather, and the like. An initial physical transfer path 120 may be generated as a function of the alimentary combination. For example, an initial physical transfer path 120 for an alimentary combination that includes highly perishable items may be different than an initial delivery path 120 of non-perishable alimentary combinations to the same user. Initial physical transfer path 120 may include a path that includes for the transfer of alimentary combinations to a plurality of users. As an example, an initial physical transfer path 120 generated for the transfer of an alimentary combination to a user may be the same path used for the transfer of alimentary combinations to other users.

With continued reference to FIG. 1A, computing device 104 is configured to identify a trouble state 124 as a function of the request for the alimentary combination. As used in this disclosure, a "trouble state" is a state that may result from a condition that may affect, for example, the delivery of the alimentary combination to user 116. This condition may result in a deviation from the predicted delivery time potentially causing a delay of delivery of alimentary combination to user 116. Trouble state 124 may arise from any condition that may cause the deviation from the predicted delivery time. Trouble state 124 may also be the result of a behavior or a plurality of behaviors from any party involved with the delivery of the alimentary combination such as, but not limited to, user 116, alimentary provider, a third party transfer party, and the like. For example, a transfer party may encounter an unexpected traffic situation while in route to user 116. A transfer party may communicate the traffic situation. Computing device 104 may identify the trouble state 124 as "late." In another non-limiting example, a transfer party may be traveling in a vehicle that experiences mechanical problems. Computing device 104 may identify trouble state 124 as "undeliverable," "need assistance," and the like.

Alternatively or additionally, and still referring to FIG. 1A, in an embodiment, identifying a trouble state 124 further comprises determining a physical transfer route for the alimentary combination. The determination and optimization of delivery routes may be implemented, without limitation, as disclosed in U.S. Nonprovisional application Ser. No. 16/890,339, filed on Jun. 2, 2020, and entitled, "METHODS AND SYSTEMS FOR PATH SELECTION USING VEHICLE ROUTE GUIDANCE," and U.S. Nonprovisional application Ser. No. 16/919,573, filed on Jul. 2, 2020, and entitled "A METHOD AND SYSTEM FOR SELECTION OF A PATH DELIVERIES;" each of U.S. Nonprovisional application Ser. No. 16/890,339 and U.S. Nonprovisional application Ser. No. 16/919,573 is incorporated by reference herein in its entirety. Selecting a delivery route may be a function of, for example, the weather, traffic conditions, road construction, and the like, which may lead to a physical transfer route that is not the shortest but may be the fastest.

Still referring to FIG. 1A, identifying a trouble state 124 includes generating a predicted time of delivery as a function of a physical transfer path. As used in this disclosure, "predicted time of delivery" is the time it may take a transfer party to get from the location of the alimentary provider to the location of the user. The predicted delivery time may be based on the same factors that may be used to determine a physical transfer path. Physical path priority may correspond to how soon an order will be ready for delivery. In other words, the physical path priority may correspond to a time at which a given order is likely to be available for delivery to user 116 based for instance on assembly times by the alimentary provider, as well as on a time at which an order was initiated. Projected lateness of a route may correspond to the difference in time between an estimated delivery time initially projected for a physical path and an estimated delivery time, such as delivery event, which may be predicted by a system based on updates received. In some embodiments, an estimated delivery time projected for a physical path may be determined based on real-time traffic information and other geographic data items; this may also be determined based on historical transfer party performance data. In some embodiments, if the projected physical path delivery time is later than a predicted and/or requested time for delivery, then the route may be assigned a lower score. By contrast, if a projected route delivery time is earlier than a requested and/or predicted time for delivery, then a route may be assigned a higher score. In some embodiments, an estimated delivery time projected by a route may be compared to a predetermined time threshold; if a projected delivery time is beyond the time threshold, the route may be given a zero score.

As a non-limiting example, a physical transfer route may be determined based on traffic conditions; the impact of those traffic conditions may be reflected in the determination of the predicted time of delivery. Other factors may have an impact which may not be reflected in the predicted delivery time. For example, user 116 may reside in a common ownership community such as a condominium. Transfer party may have to park at a distance from the location of the user and may have to walk to get to the location of user 116, hence, delaying the delivery of the alimentary combination. The predicted delivery time may not reflect for other issues transfer party may experience. For example, the alimentary provider may be in an urban area where it may be difficult to park. Another non-limiting example may include the alimentary combination may not be ready when transfer party arrives at the location of the alimentary provider.

With continued reference to FIG. 1A, identifying a trouble state 124 includes computing a trouble state cause. As used in this disclosure, a "trouble state cause" is the cause of a discrepancy between the predicted delivery time and the actual delivery time. As used in this disclosure, "actual delivery time" is the time when an alimentary combination arrives at user's selected location for delivery to occur. Actual delivery time may be computed as the time transfer party arrives at user 116 location. Actual delivery time may be computed as the time transfer party hands alimentary combination to user 116. Computing a trouble state 124 includes receiving a delayed delivery notification. As an example, a user may receive a delayed delivery notification that the alimentary combination ordered may be thirty minutes later than the predicted time. Trouble state may indicate that the food will be "late." Trouble state cause may be due, for example, to too many orders at the alimentary combination provider. Another non-limiting trouble state cause may indicate that the transfer party was 30 minutes late arriving at the alimentary provider.

Alternatively or additionally, and still referring to FIG. 1A, computing the trouble state cause includes training a machine-learning process using trouble state cause training data 132 correlating delayed delivery notification to a trouble state cause. Trouble state cause will be outputted as a function of the delayed delivery notification and the machine-learning process, for instance as described below.

Figure 3:
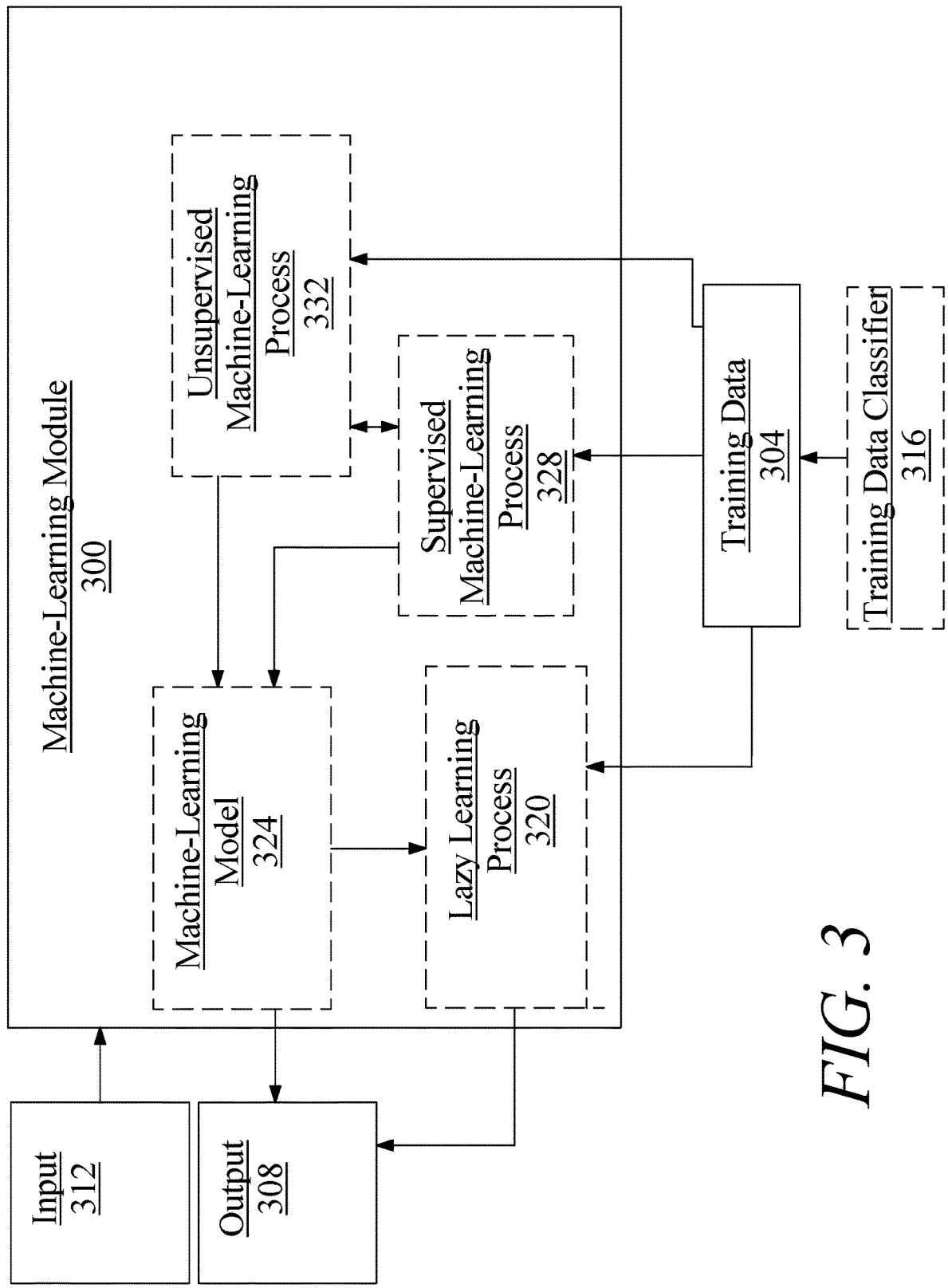
FIG. 3 is a block diagram of an exemplary embodiment of a machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, computing device may receive as delayed delivery notifications as inputs and outputs a trouble state cause.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to, for example, a trouble state based on training data correlating trouble state 124 with sources as described in further detail below.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance in an embodiment, a supervised learning algorithm may identify a trouble state cause which may include outputting the trouble state cause using delayed delivery notification as an input and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 3, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data 304.

Referring back to FIG. 1A, computing device 104 is configured to classify the trouble state 124 to at least a source 128. Computer device 104 receives trouble state training data 132 where the trouble state training data 132 correlates the trouble state with sources. As used in this disclosure, a "source" is the person, place, or instrumentality that causes the trouble. For example, a problem with a delivery vehicle may show an example where the source of trouble is an instrumentality. Another non-limiting example of a source of trouble may include the failure of a transfer party to show and pick up the alimentary combination at the alimentary provider. A trouble state classifier 136 may be trained as a function of the trouble state training data 132. Training data and classifiers are discussed above. As an example, the trouble state classifier 136 and the trouble state 124 may serve as inputs which outputs the at least a source 128. Training state training data 132 may be compiled from past user interactions where trouble states correlate to sources. For example, a trouble state of "late delivery due to traffic" may have a source of "transfer party." Past user interactions may indicate that a trouble state of late may be correlated with the transfer party. As another example, a trouble state of "late delivery due to rush of orders" may be correlated to a source identified as an alimentary provider. The past user interactions may be used to update training data 132.

Still referring to FIG. 1A, in an embodiment, computing device 104 is configured to update the trouble state training data 132 by incorporating the user 116 input related to the trouble state 124 into the trouble state training data 132. Examples of user input may include, but not limited to, road conditions that may be unknown to transfer party, sudden weather changes, delivery made to an incorrect location due to similarities in user 116 locations, and the like. As a non-limiting example, a user 116 may have received a trouble state 124 that alimentary combinations may be late due to a known road construction project. User 116 may send input related to the road construction which may be incorporated into trouble state training data 132. A future request originating from a location near the construction project may show a trouble state 116 and source 128 as "late due to construction project." User 116 input may be used to generate a new trouble state classifier 136 based on updated training data 132.

Still referring to FIG. 1A, in an embodiment, computing device 104 is configured to sort the trouble state 124 as a function of the alimentary combination. For example, user 116 may request an alimentary combination that includes a perishable item like raw milk or may request that the alimentary combination include milk as a standalone beverage. Perishable items may receive a higher priority over non-perishable items. As an example, a trouble state 124 indicating that an alimentary combination may be late may have a higher priority over an item that may be in a trouble state 124 late, but the alimentary combination may only include non-perishable items such as, but not limited to raw fruits and vegetables. In this instance, computing device 104 may schedule delivery of the alimentary combination that may include perishable items ahead of the alimentary combination that includes non-perishable items.

Still referring to FIG. 1A, computer device 104 is configured to generate a modified physical transfer path 140 as a function of the initial physical transfer path 120 and the source 128. As used in this disclosure, a "modified physical transfer path" is a physical transfer path that may differ from the initial physical transfer path 120. The modified physical transfer 140 may be selected, for example, if trouble state 116 may delay the delivery of an alimentary combination to user 116 by an amount of time that exceeds a delivery time threshold value. As an example, if the delivery time threshold value is 30 minutes, and a trouble state where there is no transfer party available to deliver the alimentary combination to user 116 exceeds the delivery time threshold value, modified physical transfer path 140 may be selected instead of initial physical transfer path 120, where the modified physical transfer path 140 may include a new transfer party. Modified physical transfer path 140 may include a single transfer party making a single delivery of an alimentary combination. Modified physical transfer path 140 may include a single transfer party making a plurality of deliveries along modified transfer path 140.

Still referring to FIG. 1A, in an embodiment, computer 104 may generate a modified physical transfer path 140 by generating a modified physical transfer path 140 from a plurality of modified physical transfer paths as a function of the trouble state 124 and location of the user 116. As an example, user 116 may have requested an alimentary combination which may be in trouble state of "late." Modified physical transfer path 140 may be generated from a plurality of modified physical transfer paths to reduce the amount of time for the late delivery by selecting a modified physical transfer path that is based on the location of the user 116. For example, modified physical transfer path may be less congested than the initial physical transfer path 120 which may reduce the amount of time by which the alimentary combination is late. Modified physical transfer route 140 may be selected based on a new location provided by user 116. For example, to reduce the amount of time by which the alimentary combination is late, user 116 may choose to change their location to a location closer to the location of the alimentary combination. Additionally, generating a modified transfer path 140 for delivery for the alimentary combination may include updating the predicted time of delivery as a function of the location of the alternate delivery route. For example, user 116 may receive a projected time of delivery based on the request for the alimentary combination. User 116 may receive an updated projected time of delivery based on selection of modified physical transfer path 140 based on user's location and source of trouble.

Figure 1B:
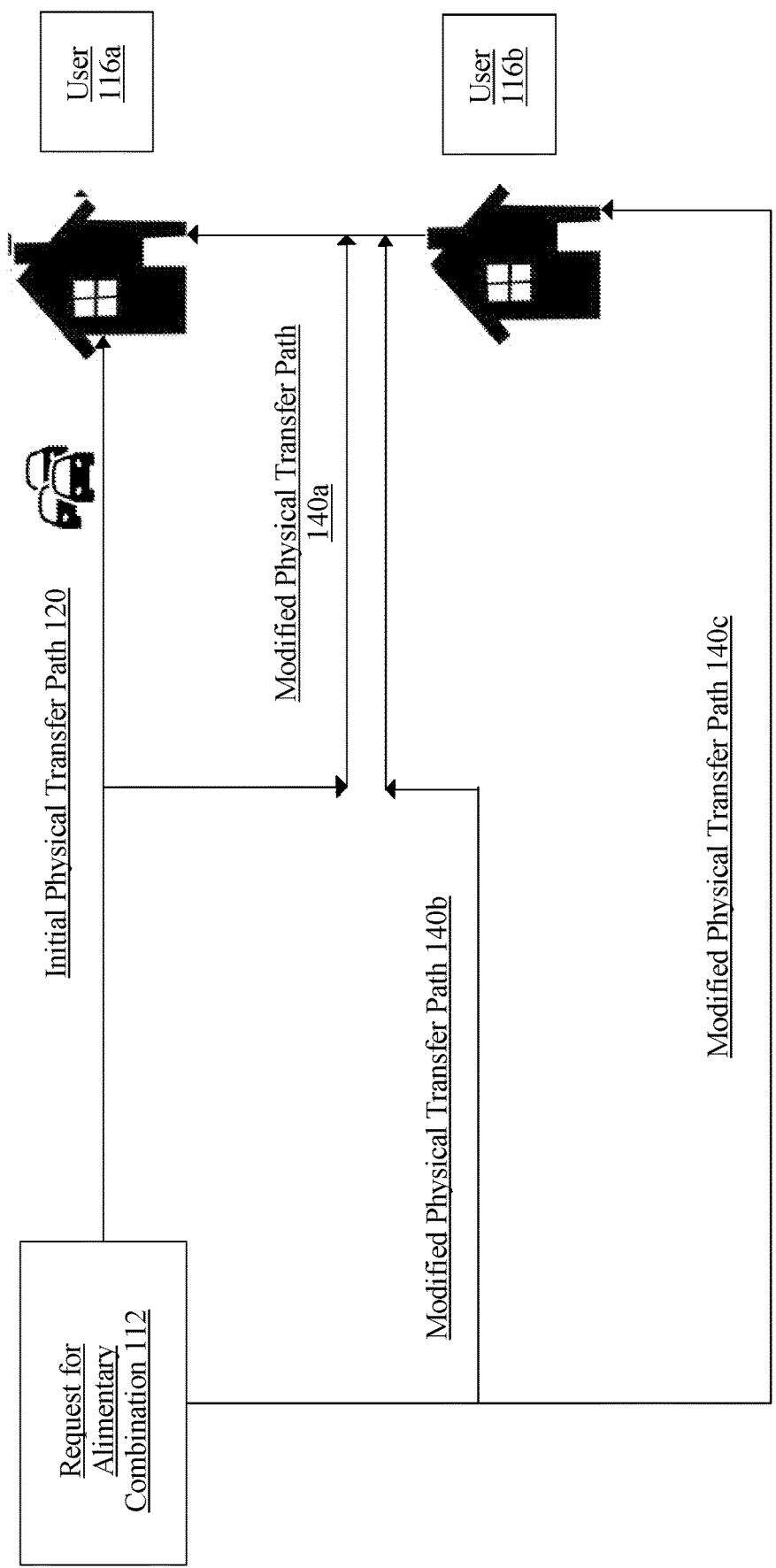
FIG. 1B is a flow diagram illustrating an exemplary embodiment of a method of path selection.

Now referring to FIG. 1B, an exemplary embodiment of how computing device 104 generates a modified physical transfer path 140 is demonstrated. As a non-limiting example, user 116*a* makes a request for an alimentary combination 112 from an alimentary provider. An initial physical transfer path 120 is selected for transfer of the alimentary combination from the alimentary provider to user 116*a*. A transfer party takes the alimentary combination from an alimentary provider to user 116*a* using initial physical transfer 120. Transfer party may experience a delay based on traffic conditions, weather, and the like along initial physical transfer path 120. Modified physical transfer path 140 may be generated based on, for example, the proximity of the alimentary provider to user 116*a*. Based on selection of modified physical transfer path 140*a*, the predicted time of delivery may be updated. Alternatively, modified physical transfer path 140*b* may be generated, based on, for example, a shorter transfer time based on traffic conditions, and the like. Based on selection of modified physical transfer path 140*b*, the predicted time of delivery may be updated. Alternatively, an alternate transfer party may be selected to deliver the alimentary combination to user 116*a*. Alternate transfer party may combine deliveries to reduce the delivery times. Modified physical transfer path 140*c* may be selected for the alternate transfer party to deliver the alimentary combination to user 116*a*. Alternate transfer party, for example, may deliver an alimentary combination to user 116*b* followed by delivery to user 116*a*. Based on selection of modified physical transfer path 140*c*, the predicted time of delivery may be updated.

Alternative or additionally, and still referring to FIG. 1A, in another embodiment, computing device 104 is configured to present modified physical transfer route 140 to the user as a function of the user preferences. As used in this disclosure, "user preferences" are settings that the user can exercise control and configure as needed. Examples of user preferences include, but are not limited to, methods of receiving a predicted time of delivery; methods of receiving delivery status updates; methods of receiving modified physical transfer route; methods of receiving an updated predicted time of delivery, and the like. User 116 may configure to enable or disable user preferences. In another example, user 116 may configure any user device to receive updates regarding the request for an alimentary combination. User 116 may choose to receive, for example, updated projected time of delivery in the form of a text, phone call, email, and the like. User 116, upon receiving an updated projected time of delivery in the form of a text or an email may send a transmission back which may include a cancellation for the request of the alimentary combination. In an embodiment, the request for the alimentary combination is updated as a function of the trouble state and the source. As a non-limiting example, the request for the alimentary combination may be updated to include information as to the source and the reason for the updated delivery time. User 116 may choose to view simple details for the reason such as the updated delivery time. User 116 may also choose to view expanded details which may include, but not limited to, the reason for the update and the modified physical transfer path that a transfer party may use.

Alternatively or additionally, and still referring to FIG. 1A in another embodiment, computing device 104 is configured to initiate a user alert communication as a function of the modified physical transfer route 140. As a non-limiting example, computing device 104 may initiate, for example, a phone call between user 116 and the alimentary combination provider, the transfer party, and the like. User 116 may receive user alert communication in any mobile device such as, but not limited to, a smartphone, tablet device, laptop computer, and the like. For example, a transfer party may choose to initiate an user alert communication with user 116 and give user 116 an updated predicted time of arrival based on delivery parameters such as, but not limited to, traffic and weather experienced by the transfer party by using modified physical transfer route 140.

Still referring to FIG. 1A, in an embodiment generating a modified physical transfer path 140 may include selecting an alternate transfer party from a plurality of transfer party as a function of the trouble state and location of the alternate transfer party. As an example, user 116 may have requested an alimentary combination which may be in trouble state of "late." Modified physical transfer path 140 may be generated from a plurality of transfer party to reduce the amount of time for the late delivery by selecting a modified physical transfer path that is based on the location of a transfer party. An alternate transfer party different from a first transfer party assigned to deliver the alimentary combination may be selected from a plurality of transfer party based on the proximity of the alternate transfer party to the location of the first transfer party. For example, delivering an alimentary combination to user 116 by first transfer party using the modified physical path may delay deliveries to all users within the modified physical path. The selection of an alternate transfer party may improve the delivery time for user 116 as alternate transfer party may be able to go to straight to user 116 rather than making additional stops that may be prescribed in the modified physical transfer path. Generating a modified physical transfer path 140 may include updating the predicted time of delivery as a function of the location of the alternate transfer party. For example, user 116 may receive a projected time of delivery based on the request for the alimentary combination. User 116 may receive an updated projected time of delivery based on selection of modified physical transfer path 140 based on of the trouble state and location of the alternate transfer party.

Still referring to FIG. 1A, in an embodiment generating a modified physical transfer path 140 may include generating a ranking for transferring a plurality of alimentary combinations as a function of a reduced delivery time for the plurality of alimentary combinations. User 116 may have requested an alimentary combination which may be in trouble state of "late." Computing device 104 may rank the order in which the alimentary combinations are delivered to reduce delivery time for the alimentary combinations. As an example, a trouble state of "late" due to a traffic accident may delay all deliveries of alimentary combinations from, as an example, an alimentary combination provider. As a result, a modified physical transfer path 140 may be generated that delivers first the alimentary combinations that have been delayed the longest while scheduling delivery of alimentary combinations not as late for after delivery of the alimentary combinations that have been delayed the longest. User 116 may receive an updated projected time of delivery based on a reduced delivery time for the plurality of alimentary combinations.

Alternatively or additionally, and still referring to FIG. 1A, in an embodiment, computing device 104 is configured to determine a trouble source owner 144 from a plurality of trouble source owners. As used in this disclosure, a "trouble source owner" is a person, entity, and the like who assumes responsibility for a problem and a solution to that problem. Examples include, but not limited to, alimentary combination providers, staff of alimentary combination providers, transfer party of alimentary provider combinations, users who request alimentary combinations, and the like. Trouble source training data 148 that includes past trouble source owners to past sources of trouble may be used as part of the machine-learning process. In an embodiment, a machine-learning process may be trained using the training data correlating trouble source to past trouble source owners. For example, a trouble state of "late" may associate a alimentary combination provider as an owner of the source. A trouble source of "late" may be associated with a transfer party. A trouble state of "mechanical car issues" may be associated with the transfer party. Computing device 104 may receive a trouble source state. Computing device 104 may output the trouble source owner as a function of the trouble state using the machine-learning process.

Figure 4:
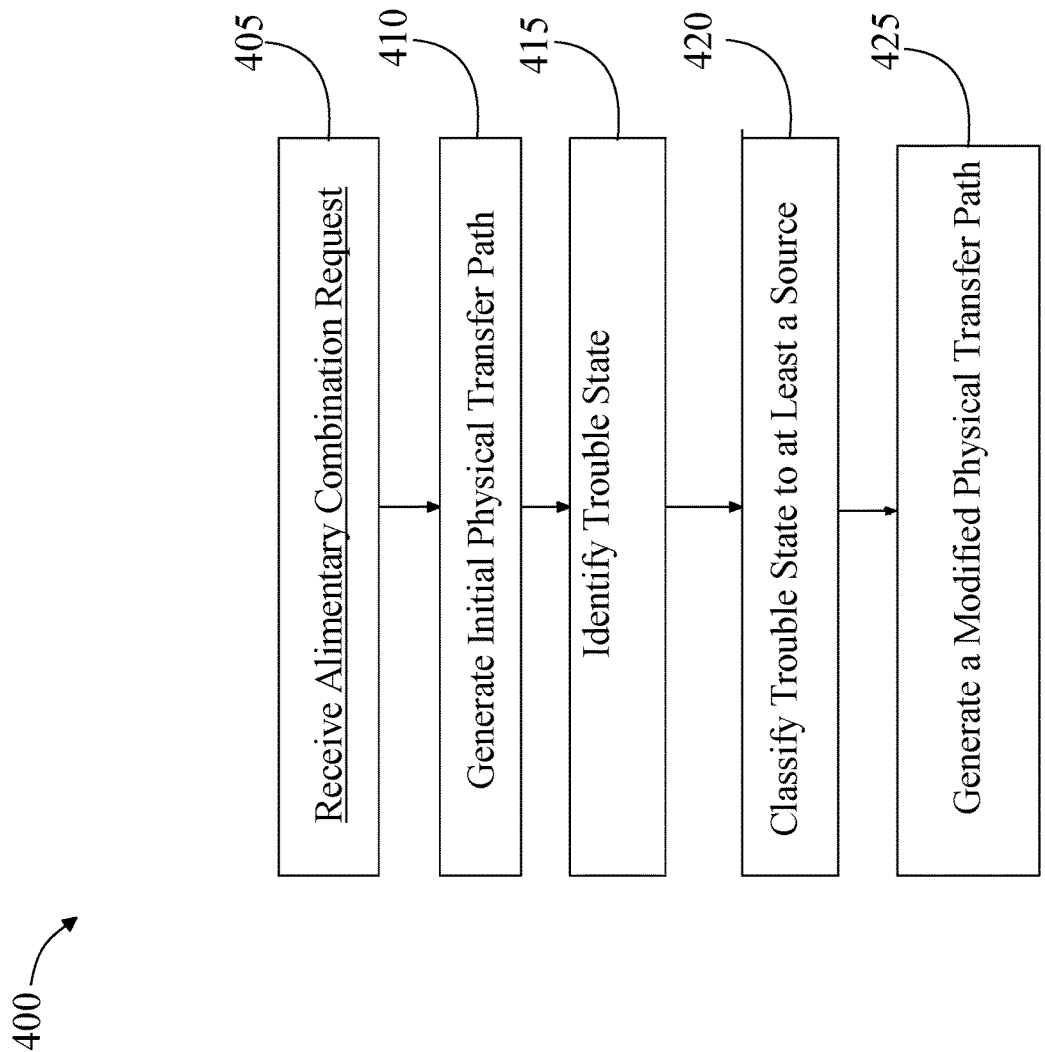
FIG. 4 is a flow diagram illustrating an exemplary embodiment of a method of generating an elementary combination help update.

Referring now to FIG. 4, an exemplary embodiment of a method 400 for generating an alimentary combination help update is illustrated. At step 405, computing device may receive a request for an alimentary combination from a user. This may be implemented, without limitation as described in FIGS. 1A-3. The request may be used to generate an initial physical transfer path.

Still referring to FIG. 4, at step 410, computing device may generate an initial physical transfer path as a function of the request for an alimentary combination. This may be implemented, without limitation, as described in FIGS. 1A-3.

Still referring to FIG. 4, at step 415, computing device may identify a trouble state as a function of the request for the alimentary combination. This may be implemented, without limitation, as described in FIGS. 1A-3. Identifying a trouble state may include determining a physical transfer route for the alimentary combination. Identifying a trouble state may include generating a predicted time of delivery as a function of the physical transfer route. Additionally, a trouble state may include computing a trouble state cause. Computing a trouble state cause includes receiving a delayed delivery notification. Additionally, computing a trouble state cause may include training a machine-learning process using trouble state cause training data correlating delayed delivery notification to a trouble state cause. Computing a trouble cause may include outputting the trouble state cause as a function of the delayed delivery notification and the machine-learning process. This may be implemented, without limitation, as described in FIGS. 1A-3.

Still referring to FIG. 4, at step 420, computing device may classify the trouble state to at least a source. Classifying the trouble state may include receiving trouble state training data, wherein the trouble state training data correlates trouble states with sources. This may be implemented, without limitation, as described in FIGS. 1A-3.

Alternatively or additionally, and still referring to FIG. 4 classifying the trouble state may include training a trouble state classifier as a function of the trouble state training data. This may be implemented, without limitation, as described in FIGS. 1A-3.

Alternatively or additionally, and still referring to FIG. 4, classifying the trouble state may include identifying the at least a source as a function of the trouble state classifier and the trouble state. This may be implemented, without limitation, as described in FIGS. 1A-3.

With continued reference to FIG. 4, the trouble state training data is updated by incorporating the user input of the trouble state into the trouble state training data. This may be implemented, without limitation, as described in FIGS. 1A-3.

Alternatively or additionally, and still referring to FIG. 4, computing device may sort the trouble state as a function of the alimentary combination. This may be implemented, without limitation, as described in FIGS. 1A-3.

Still referring to FIG. 4, at step 425, computing device may generate a modified physical transfer path as a function of the initial physical transfer path and the source. This may be implemented, without limitation, as described in FIGS. 1A-3.

With continued reference to FIG. 4, the modified physical transfer path is presented to the user as a function of a user preference. This may be implemented, without limitation, as described in FIGS. 1A-3.

Alternatively or additionally, and still referring to FIG. 4, computing device may initiate a conferencing event as a function of the modified physical transfer path. This may be implemented, without limitation, as described in FIGS. 1A-3.

With continued reference to FIG. 4, generating a modified physical transfer path may include selecting an alternate delivery route from a plurality of routes as a function of the trouble state and location of the user. Generating a modified physical transfer path may include updating the predicted time of delivery as a function of the alternate delivery route. This may be implemented, without limitation, as described in FIGS. 1A-3.

Alternatively or additionally, and still referring to FIG. 4, generating a modified physical transfer path may include selecting an alternate transfer party from a plurality of transfer parties as a function of the trouble state and location of the alternate transfer party. Generating a modified physical transfer path may include updating the predicted time of delivery as a function of the location of the alternate transfer party. This may be implemented, without limitation, as described in FIGS. 1A-3.

Alternatively or additionally, and still referring to FIG. 4, generating a modified physical transfer path may include determining an order for delivering of a plurality of alimentary combinations as a function of a reduced delivery time for the plurality of alimentary combinations. Generating a modified physical transfer path may include updating the predicted time of delivery for the plurality of alimentary. This may be implemented, without limitation, as described in FIGS. 1A-3.

Still referring to FIG. 4, computing device determines a trouble source owner from a plurality of trouble source owners. Determining a trouble source owner may include training a machine-learning process using the training data correlating trouble source to past trouble source owner. Determining a trouble source owner may include receiving a trouble source state; and outputting the trouble source owner as a function of the trouble state using the machine-learning process. This may be implemented, without limitation, as described in FIGS. 1A-3.

It is to be noted that any one or more of the aspects and embodiments described herein may be conveniently implemented using one or more machines (e.g., one or more computing device 104s that are utilized as a user computing device 104 for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device 104) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device 104) and any related information (e.g., data structures and data) that causes the machine to perform any one of the methodologies and/or embodiments described herein.

Examples of a computing device 104 include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device 104 may include and/or be included in a kiosk.

Figure 5:
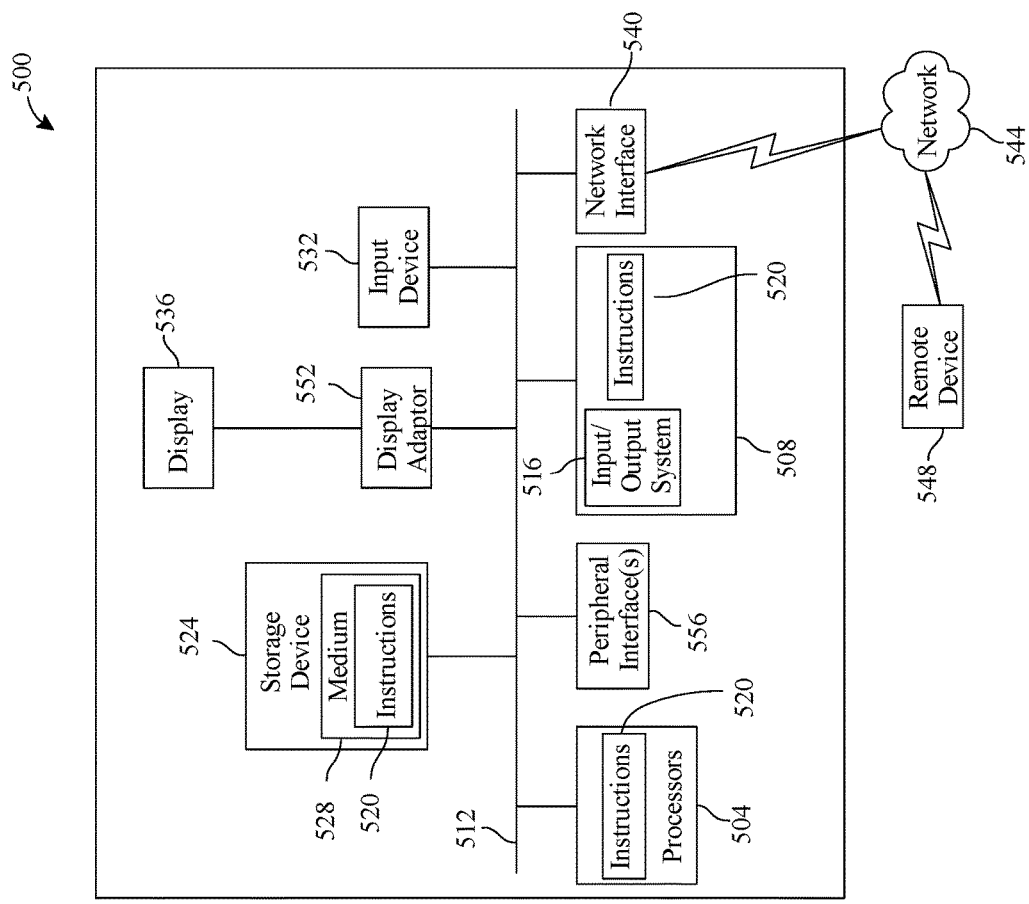
FIG. 5 is a block diagram of a computing system that can be used to implement any one or more of the methodologies disclosed herein and any one or more portions thereof.

FIG. 5 shows a diagrammatic representation of one embodiment of a computing device 104 in the exemplary form of a computer system 500 within which a set of instructions for causing a control system to perform any one or more of the aspects and/or methodologies of the present disclosure may be executed. It is also contemplated that multiple computing device 104s may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIRE-WIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing device 104s, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for generating an alimentary combination help update, the system comprising a computing device configured to:
   receive a request for an alimentary combination from a user; generate an initial physical transfer path as a function of the request;
   identify a trouble state as a function of the request for the alimentary combination, wherein identifying a trouble state comprises;
      determining a physical transfer route for the alimentary combination;
      generating a predicted time of delivery as a function of the physical transfer route; and
      computing a trouble state cause by:
         receiving a delayed delivery notification;
         training a machine-learning process using trouble state cause training data correlating delayed delivery notification to a trouble state cause; and outputting the trouble state cause as a function of the delayed delivery notification and the machine-learning process;
   classify the trouble state to at least a source, wherein classifying comprises:
      training a trouble state classifier as a function of a trouble state training data correlating a plurality of trouble states with a plurality of respective sources, wherein the trouble state classifier is configured to receive the trouble state as an input and output at least a source as a function of the trouble state training data; and
      classifying the trouble state to the at least a source as a function of the trouble state classifier and a trouble source owner, wherein a trouble source owner comprises a responsible party; and
   modify the physical transfer path as a function of the initial physical transfer path and the at least a source.

2. The system of claim 1, wherein the computer device is further configured to update the request for the alimentary combination as a function of the trouble state and the source.

3. The system of claim 1, wherein generate a modified physical transfer path further comprises:
   generating a modified physical transfer path from a plurality of modified transfer paths as a function of the trouble state and location of the user; and
   updating the predicted time of delivery as a function of the modified physical transfer path.

4. The system of claim 1, wherein generate a modified physical transfer path further comprises:
   selecting an alternate transfer party from a plurality of transfer parties as a function of the trouble state and location of the alternate transfer party; and
   updating the predicted time of delivery as a function of the location of the alternate transfer party.

5. The system of claim 1, wherein generating the modified physical transfer path further comprises:

generating a ranking for transferring of a plurality of alimentary combinations as a function of a reduced delivery time for the plurality of alimentary combinations; and updating the predicted time of delivery for the plurality of alimentary.

6. The system of claim 1, wherein the generating the modified physical transfer path is presented to the user as a function of a user preference.

7. The system of claim 1, wherein computing device is further configured to initiate a user alert communication as a function of the selected alternate delivery.

8. The system of claim 1, wherein computing device is further configured to update the trouble state training data by incorporating the user input related to the trouble state into the trouble state training data.

9. The system of claim 1, wherein computing device is further configured to determine the trouble source owner from a plurality of trouble source owners by:
   training a machine-learning process using the training data correlating trouble source to past trouble source owner;
   receiving a trouble source; and
   outputting the trouble source owner as a function of the trouble state using the machine-learning process.

10. The system of claim 1, wherein computing device is further configured to sort the trouble state as a function of the alimentary combination.

11. A method for generating an alimentary combination help update, the method comprising: receiving a request for an alimentary combination from a user; generating an initial physical transfer path as a function of the request;
   identifying a trouble state as a function of the request for the alimentary combination, wherein identifying a trouble state further comprises:
      determining a physical transfer route for the alimentary combination; generating a predicted time of delivery as a function of the physical transfer route; and
      computing a trouble state cause by:
         receiving a delayed delivery notification;
         training a machine-learning process using trouble state cause training data correlating delayed delivery notification to a trouble state cause; and
         outputting the trouble state cause as a function of the delayed delivery notification and the machine-learning process;
   classifying the trouble state to at least a source, wherein classifying comprises:
      receiving trouble state training data, wherein the trouble state training data correlates trouble states with sources;
      training a trouble state classifier as a function of the trouble state training data; and
      identifying the at least a source as a function of the trouble state classifier, the trouble state, and a trouble source owner, wherein a trouble source owner comprises a responsible party; and
   generating a modified physical transfer path as a function of the initial physical transfer path and the source.

12. The method of claim 11, wherein the method further comprises updating the request for the alimentary combination as a function of the trouble state and the source.

13. The method of claim 11, wherein generating a modified physical transfer path further comprises:
   selecting an alternate delivery route from a plurality of routes as a function of the trouble state and location of the user; and
   updating the predicted time of delivery as a function of the alternate delivery route.

14. The method of claim 11, wherein generate a modified physical transfer path further comprises:
   selecting an alternate transfer party from a plurality of transfer parties as a function of the trouble state and location of the alternate transfer party; and
   updating the predicted time of delivery as a function of the location of the alternate transfer party.

15. The method of claim 11, wherein generate a modified physical transfer path further comprises:
   generating a ranking for transferring of a plurality of alimentary combinations as a function of a reduced delivery time for the plurality of alimentary combinations; and
   updating the predicted time of delivery for the plurality of alimentary.

16. The method of claim 11, wherein the modified physical transfer path is presented to the user as a function of a user preference.

17. The method of claim 11, wherein the method further comprises initiating a user alert communication as a function of the modified physical transfer path.

18. The method of claim 11, wherein the method further comprises updating the trouble state training data by incorporating the user input of the trouble state into the trouble state training data.

19. The method of claim 11, wherein the method further comprises determining the trouble source owner from a plurality of trouble source owners by:
   training a machine-learning process using the training data correlating trouble source to past trouble source owner;
   receiving a trouble source state; and
   outputting the trouble source owner as a function of the trouble state using the machine-learning process.

20. The method of claim 11, wherein the method further comprises sorting the trouble state as a function of the alimentary combination.

* * * * *